UNITED STATES PATENT OFFICE.

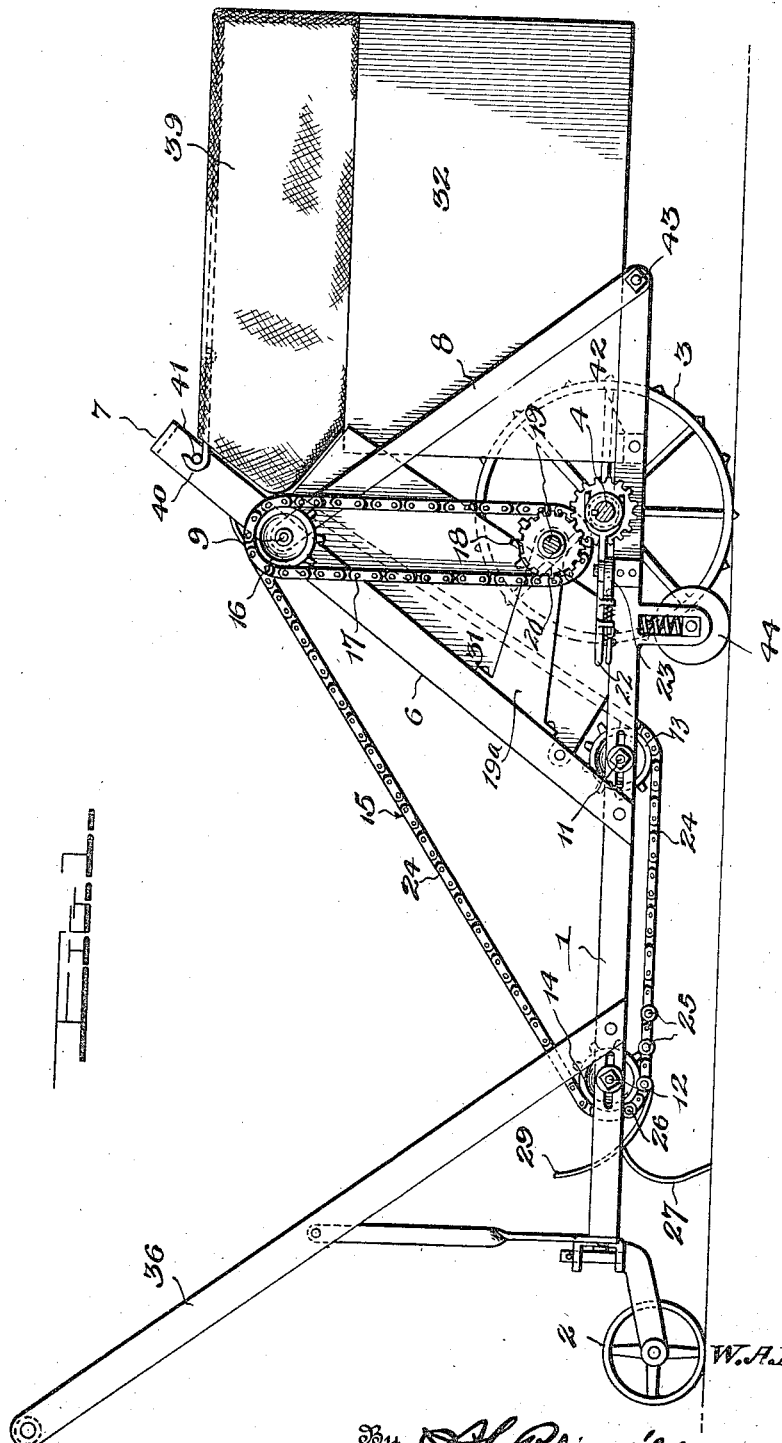

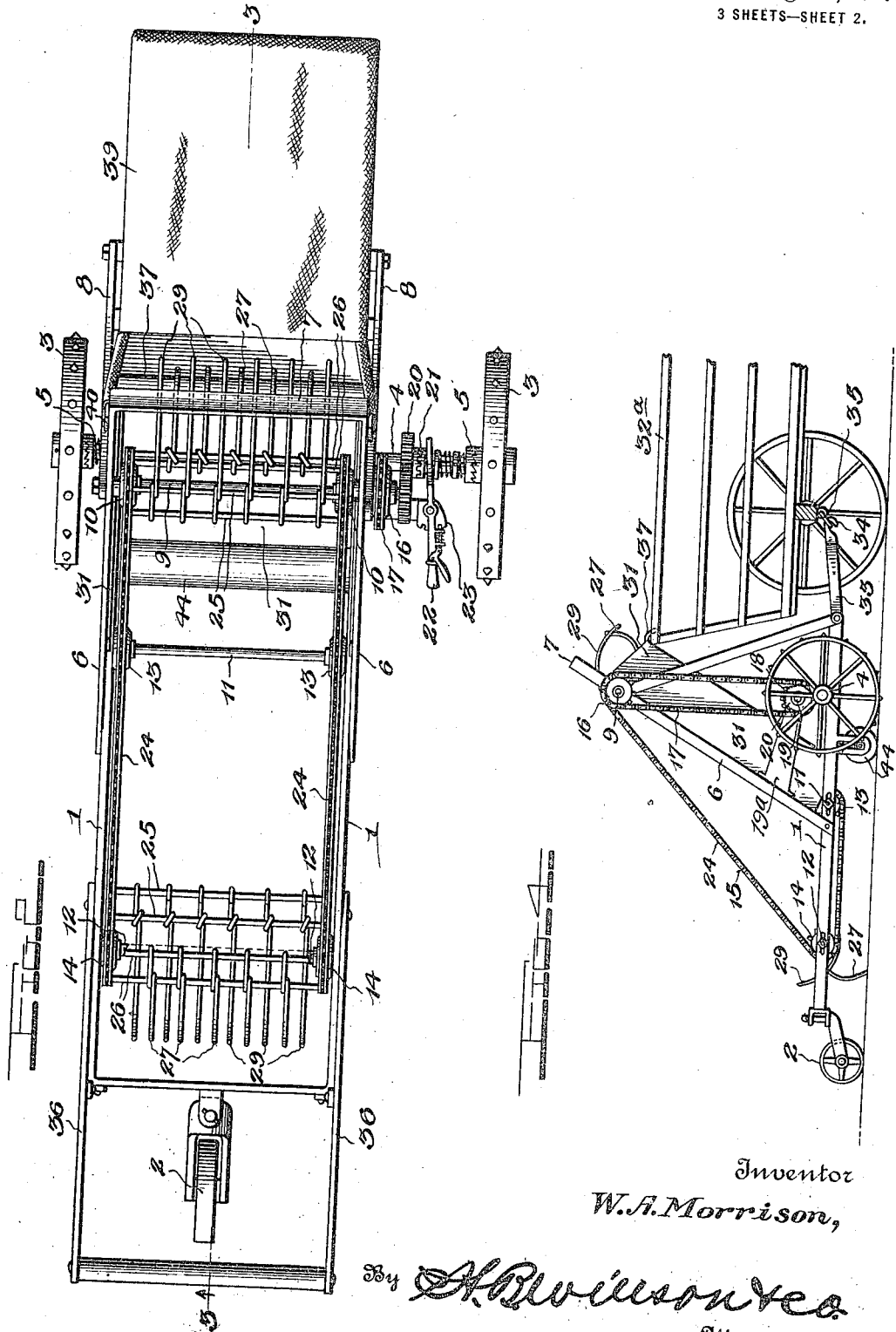

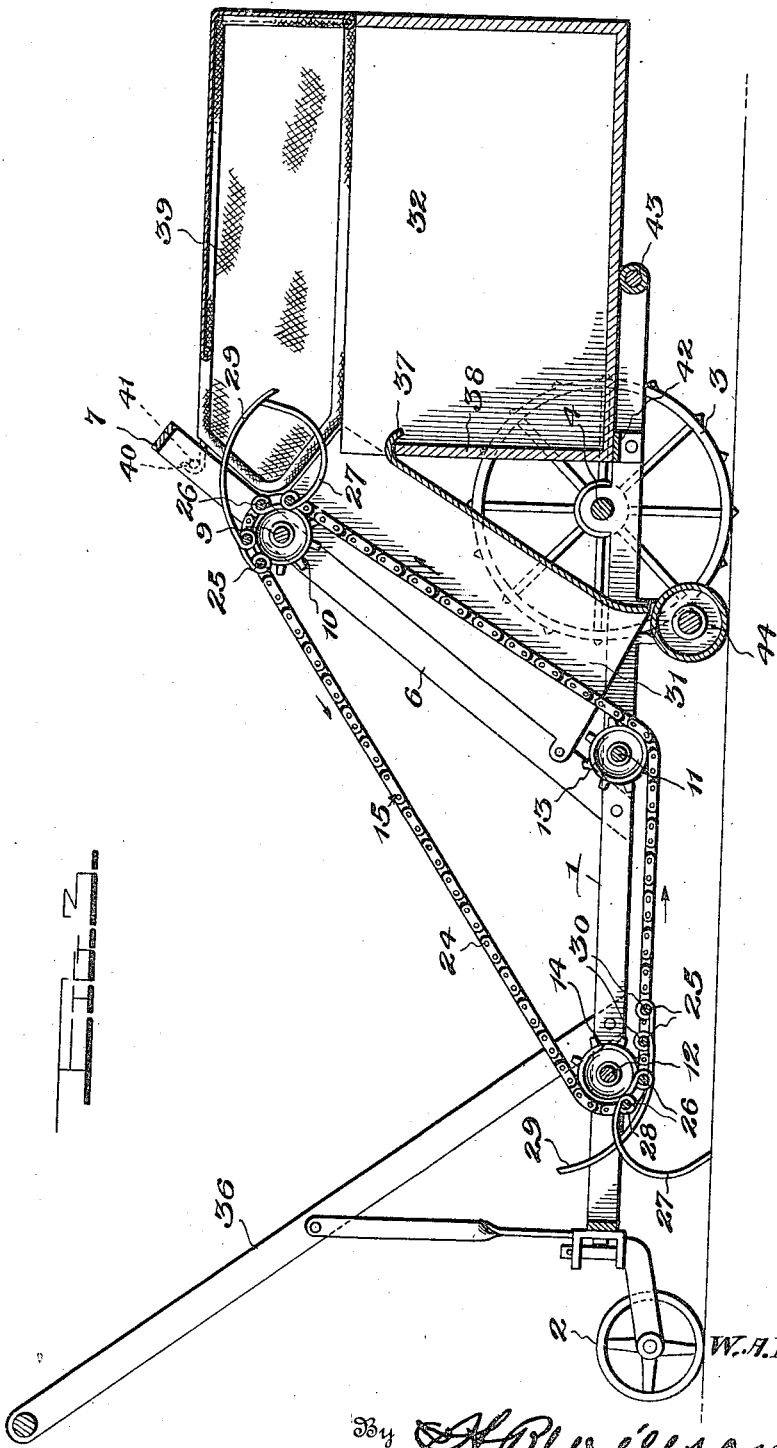

WILLIAM A. MORRISON, OF HUNTSVILLE, MISSOURI.

RAKE AND LOADER.

1,237,543.
Specification of Letters Patent.
Patented Aug. 21, 1917.

Application filed October 16, 1916. Serial No. 125,904.

*To all whom it may concern:*

Be it known that I, WILLIAM A. MORRISON, a citizen of the United States, residing at Huntsville, in the county of Randolph and State of Missouri, have invented certain new and useful Improvements in Rakes and Loaders; and I do declare the following to be a full, clear, and exact description of the invention, such as will enable others skilled in the art to which it appertains to make and use the same.

My invention is a combined rake and loader which may be constructed in numerous sizes for different purposes, it being the object of the invention to provide a simple yet efficient and durable machine which will gather hay, grass, leaves, trash, etc., from the ground and deliver the same into a receptacle.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation partly in section showing a hand operated rake and loader constructed in accordance with the invention;

Fig. 2 is a top plan view thereof

Fig. 3 is a central vertical longitudinal section taken on the plane indicated by the line 3—3 of Fig. 2; and Fig. 4 is a small side elevation showing a slightly different type of machine, this type being adapted for use in connection with horse drawn hay racks.

In specifically describing the construction shown in the drawings above briefly described, similar characters will be placed on corresponding parts throughout the several views and reference will be herein made to the numerous elements by their respective indices. To this end, the numeral 1 designates a horizontally disposed frame mounted at its rear end upon a caster wheel 2 and at its front end on driving wheels 3 preferably having calks to prevent slippage thereof on the earth, said wheels 3 being mounted on the opposite ends of an axle 4 and having clutch connections 5 therewith, these connections allowing differential movement of the two wheels in turning corners.

A pair of bars 6 are secured to the side bars of the frame 1 in rear of the axle 4, said bars inclining upwardly and forwardly and being connected at their upper ends by a transverse bar 7, brace bars 8 preferably inclining downwardly and forwardly from said bars 6 to the front end of the frame 1 as shown most clearly in Fig. 1. A transverse horizontal shaft 9 is rotatably mounted in appropriate bearings adjacent the upper ends of the bars 6, said shaft having thereon a pair of spaced sprocket wheels 10 located between the bars 6. A second transverse shaft 11 is rotatably mounted adjacent the lower ends of the bars 6 while yet another shaft 12 is positioned transversely of the rear end of the frame 1, said shafts 11 and 12 having thereon sprocket wheels designated respectively by the numerals 13 and 14, all of the wheels 10, 13, and 14 being provided for the mounting of an endless carrier 15 whose unique construction will be hereinafter fully described.

Any one of the shafts 9, 11 or 12 may be driven from the axle 4 for the purpose of operating the carrier 15, but the best results may be attained by driving the shaft 9 since it is at the upper end of the upwardly moving reach of the aforesaid carrier. Said shaft 9 has keyed thereon a sprocket wheel 16 around which a sprocket chain 17 passes, said chain being driven from a sprocket 18 on a stub shaft 19 which will be carried by a suitable bracket 19ª. The sprocket 18 is driven from the axle 4 through the instrumentality of a pair of intermeshing spur gears 20, one of these gears having a clutch connection with the axle 4, whereby the machine may be thrown out of gear. This connection is preferably in the form of an ordinary clutch such as that indicated at 21, said clutch being under the control of the operator through the instrumentality of a hand lever 22 which latter may be locked in adjusted position by a suitable pawl and rack 23.

The endless carrier 15 includes a pair of side chains 24 trained around the sprocket wheels 10, 13 and 14, and a plurality of series of transverse rods, each of said series consisting of a pair of rods 25 and an additional pair 26, all of said rods being secured rigidly at their ends to the chains 24 in any appropriate manner. C-shaped rake teeth 27 are bent at one end to form eyes 28 mounted on the rods 26 whereby said teeth are effectively held in operative position, and arcuate rake cleaning fingers 29 are bent at one end to form eyes 30 receiving the rods 25, which rods as shown in the drawings are in advance of those indicated at 26. The fingers 29 extend rearwardly between the rake teeth 27 and are adapted to clean said teeth of the material gathered thereby at the proper time.

The rakes composed of the teeth 27 are adapted to move forwardly along the ground at a greater rate of speed than that at which the machine is traveling, said rakes thus quickly gathering any material which may be in the path thereof. As the rakes move along the upwardly traveling reach of the carrier 15, that is between the shafts 11 and 9, the loads of said rakes are carried within an inclined trough 31 positioned in advance of said reach of the carrier 15, said trough being of a length to carry the material to the desired height. In Figs. 1 to 3, the trough 31 delivers into a receptacle 32 carried detachably on the frame 1, but in Fig. 4 which illustrates a larger machine, said trough discharges into a horse drawn hay rack 32ª, the machine being connected to said rack through the instrumentality of an appropriate tongue 33 having a hook 34 at its front end, this hook being received in an eye or the like 35 shown in the present embodiment of the invention as carried by the axle of the rack 32ª.

In constructing small sizes of the machine for use on lawns, parts or the like, the frames 1 will be provided with operating handles 36 whereby the machines may be operated by hand, and on such machines, the receptacles 32 will be rendered detachable in any suitable manner. In the present embodiment of the invention (see more particularly Fig. 3), the bottom of the trough 31 is bent forwardly at its upper end into the form of a hook 37 beneath which the upper edge of the rear end 38 of the receptacle 32 is normally received, said receptacle being thus held against accidental forward movement, it being prevented from lateral shifting by the brace bars 8 between which it is disposed. However, when the front end of the receptacle 32 is tilted upwardly sufficiently, the edge of the wall 38 will clear the hook 37 and will thus allow the receptacle 32 to be detached for removing the contents thereof. The receptacle 32 is preferably provided with a detachable top 39, this top being shown as having hooks 40 on its rear end which engage studs or the like 41 projecting laterally from the bars 6. Cross bars 42 and 43 are shown at the front end of the frame 1 for supporting the receptacle 32 thereon, but it will be understood that other appropriate construction could well be employed.

For the purpose of preventing the material carried by the rake teeth 27 from falling therefrom beneath the trough 31 as said teeth leave the ground, a roller 44 preferably extends transversely of the machine directly beneath the bottom of said trough, said roller receiving on its periphery the ends of the teeth 27 to assist in guiding the same upwardly toward the trough 31 and at the same time serving to prevent any material from falling from said teeth.

In operation, the machine will be moved over the ground with the clutch 21 in operative position, the result being that the endless carrier 15 will be driven in the direction of the arrows on Fig. 3. This causes the rack teeth 27 to gather all material in the path thereof, said teeth then carrying this material through the trough 31 to a point above the rear end of the receptacle into which it is to be discharged. At this time, due to the fact that the rods 25 start rearwardly around the sprockets 10 in advance of the rods 26, the fingers 29 will move outwardly along the teeth 27 as shown at the upper end of Fig. 3, said fingers thus serving to dislodge all material from the rakes, said material now falling into the receptacle 32 or the rack 32ª as the case may be.

From the foregoing, taken in connection with the accompanying drawings, the construction, manner of operation and advantages of the improved rake and loader will be readily understood without requiring a more extended explanation, but in conclusion I will state that although I have shown and described certain specific details for accomplishing probably the best results, numerous changes may be made within the scope of the invention as claimed without sacrificing the main advantages thereof.

I claim:

1. In a rake and loader, the combination of a frame movable over the ground, an endless carrier mounted on said frame and having a forwardly moving reach adjacent the ground and an upwardly moving reach at the front end of said forwardly moving reach, a plurality of gathering and elevating rakes carried by said carrier, and a plurality of longitudinally disposed fingers mounted fixedly on said carrier and incapable of movement relative thereto, said fingers extending between the teeth of the rakes for forcing the gathered material from said rakes as the latter reach the upper end of the upwardly moving reach of the carrier.

2. In a rake and loader, the combination of a frame movable over the ground, an endless carrier mounted on said frame and having a forwardly moving reach adjacent the ground, an upwardly moving reach at the front end of said forwardly moving reach, and a rearwardly moving reach at the upper end of said upwardly moving reach, said carrier having a plurality of series of rigidly fixed transverse bars, each series including a front and a rear bar, gathering and elevating rakes fixedly secured to the rear bars of said series, an equal number of transverse rows of longitudinal cleaning fingers fixedly secured at one end to the front bars of said series and extending between the teeth of the rakes for forcing the gathered material therefrom as said fingers and rakes reach the limit of their upward movement and progress rearwardly.

3. In a rake and loader, the combination of a frame movable over the ground, an endless carrier mounted on said frame and having a forwardly moving reach adjacent the ground, an upwardly moving reach at the front end of said forwardly moving reach and a rearwardly moving reach at the upper end of said upwardly moving reach, said carrier including a pair of side chains and a number of series of rigidly fixed transverse rods extending between the same, each series including a front and a rear pair of said rigidly fixed rods, rake teeth having one end bent to form a pair of longitudinally spaced eyes through which the rear pairs of rods extend, and cleaning fingers having one end bent to form longitudinally spaced pairs of eyes receiving the front pairs of rods, said fingers extending between said rake teeth for forcing the gathered material therefrom as the rakes and fingers reach the limit of their upward movement and progress rearwardly.

4. In a rake and loader, the combination of a frame movable over the ground, an endless carrier mounted on said frame and having a forwardly moving reach adjacent the ground and an upwardly moving reach at the front end of said forwardly moving reach, rakes mounted on said endless carrier for gathering material from the ground and elevating the same, a trough in which the rakes are received as they move upwardly, and a transverse roller traveling on and rotated by contact with the ground, said roller having a smooth periphery and being mounted on the frame immediately below the lower end of said trough to receive the ends of the rake teeth on its periphery and guide them into the trough and to prevent loss of material from said rakes while entering said trough.

5. In a rake and loader, the combination of a rectangular frame disposed horizontally and having a pair of cross bars at its front end, a pair of rigid bars inclining upwardly and forwardly from the side bars of said frame, an upwardly and forwardly inclining trough in advance of and secured to said inclined bars, sprocket wheels mounted on shafts extending between said inclined bars and between the side bars of the frame, sprocket chains passed around said sprocket wheels and each having an upwardly moving reach disposed in the aforesaid trough, a number of series of horizontal bars extending between and fixedly secured at their ends to said sprocket chains, each series including a front and a rear bar, rake teeth carried by said rear bar, rake cleaning fingers fixedly secured to the front bar and extending between the teeth of the rakes, and a receptacle to receive the material conveyed upwardly within the trough by the aforesaid rakes, said receptacle resting on the aforesaid transverse bars of the horizontal frame.

In testimony whereof I have hereunto set my hand in presence of two subscribing witnesses.

WILLIAM A. MORRISON.

Witnesses:
WILLIAM D. WARREN,
T. W. KIRBY.

Copies of this patent may be obtained for five cents each, by addressing the "Commissioner of Patents, Washington, D. C."